G. D. EIGHMIE.
FOUR WHEEL DRIVE FOR AUTOMOBILES AND OTHER VEHICLES.
APPLICATION FILED JUNE 5, 1917.
1,273,339.                               Patented July 23, 1918.
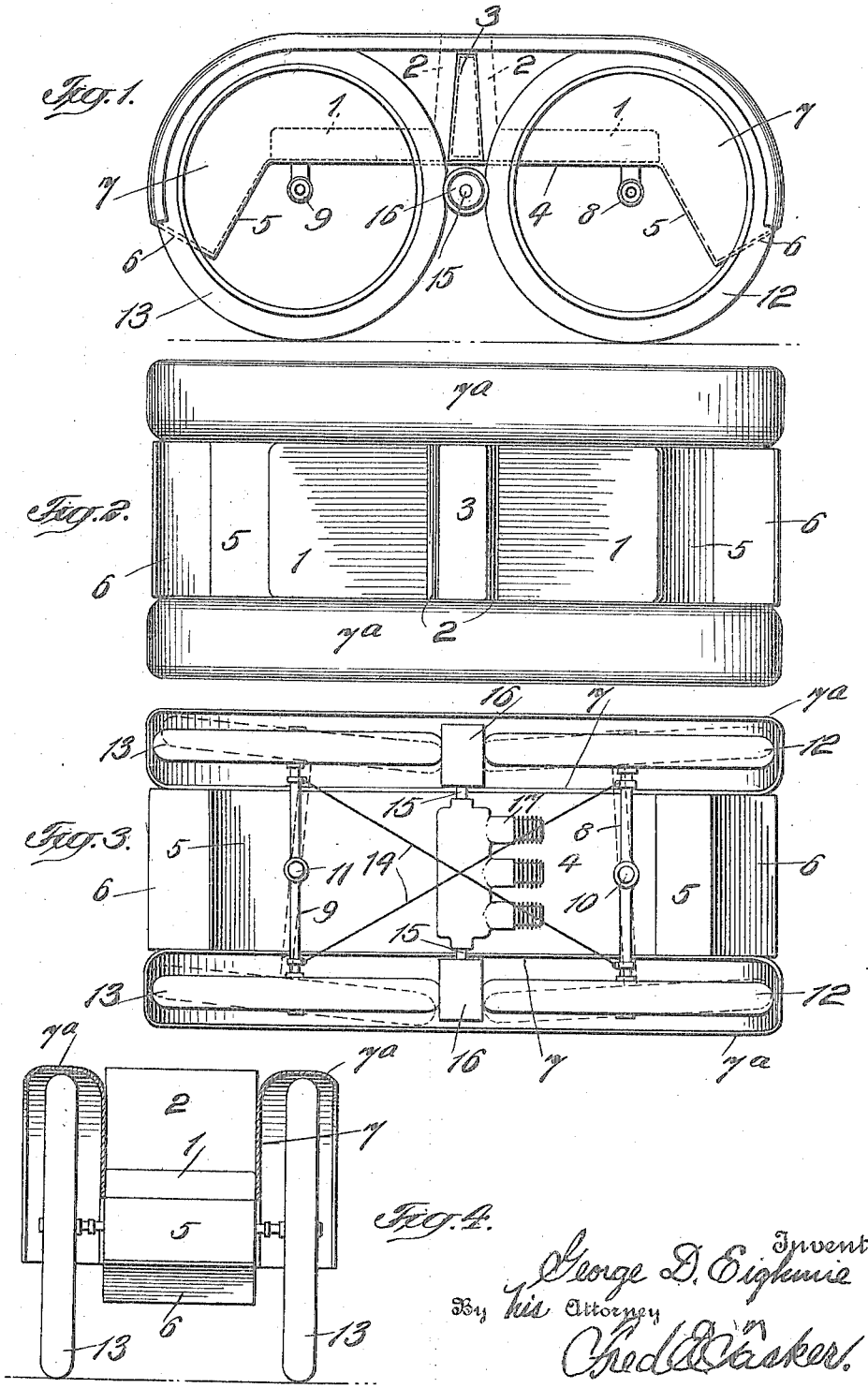

UNITED STATES PATENT OFFICE.

GEORGE D. EIGHMIE, OF NEW YORK, N. Y.

FOUR-WHEEL DRIVE FOR AUTOMOBILES AND OTHER VEHICLES.

1,273,339.     Specification of Letters Patent.     Patented July 23, 1918.

Application filed June 5, 1917. Serial No. 172,966.

*To all whom it may concern:*

Be it known that I, GEORGE D. EIGHMIE, a citizen of the United States, and resident of New York, in the county of New York, and State of New York, have invented certain new and useful Improvements in Four-Wheel Drives for Automobiles and other Vehicles, of which the following is a specification, reference being had therein to the accompanying drawing.

This invention refers to certain useful and novel improvements in motor-propelled vehicles. The design of the invention is to provide a small compact and easily operated car of the automobile type, which will be simple and efficient and in some respects will be similar to the jaunting car or perambulator, and which can be adapted for universal use because of its simplicity, economical structure, and general applicability to all kinds of work. The invention, therefore, consists essentially in the described means for accomplishing the end in view, and the various details and appurtenances thereof, substantially as will be hereinafter described and then more particularly pointed out in the appended clauses of claim.

In the accompanying drawing illustrating my invention:

Figure 1 is a side elevation of my improved simplified automobile car;

Fig. 2 is a top plan view of the same;

Fig. 3 is a bottom plan view;

Fig. 4 is an end elevation.

Similar characters of reference designate corresponding parts throughout the different figures of the drawing.

The car body may obviously have any desired form or pattern. I have illustrated two cushioned seats 1, 1 having backs 2, 2 that are placed adjacent to each other with an intervening receptacle 3 between said backs, said seats 1 being arranged so as to face toward the front and rear preferably, although I do not wish to be restricted to this particular arrangement and may place them otherwise if desired. The seats 1 are carried on any suitable main frame 4, the form, shape, and proportions of which may vary within wide limits. At the front and rear ends of the main frame 4 are the downwardly inclined members 5 carrying foot rests 6, and integral with the frame are the lateral mudguards 7 whose upper edges are turned outwardly at 7ª, as is more clearly shown in Fig. 4, said mudguards preferably continuing along the sides of the vehicle and being attached to the seat backs 2, 2. Thus a neat, small, efficient frame is provided for carrying two or more persons, and easily controlled and managed by the most unskilful driver, the car being thus capable of doing service in a great variety of ways, and of being disposed of when not in use by housing it in an ordinary entry-way of a house or area-way as easily as if it were a child's carriage or wagon, and yet a device that will be as efficient as a large heavy and expensive automobile. Access to the receptacle 3 may be had at the top side or ends, as desired, and it can be used to contain merchandise, and a variety of other things.

8 denotes one of the axles and 9 the other, either of which may be termed the front or the rear, accordingly as the car is to be driven in one direction or the other, it being evident that it can be operated in either direction with equal ease. These two axles 8 and 9 are pivoted to the main body 4 by central pivots 10 and 11. Axle 8 carries wheels 12, 12, and axle 9 carries wheels, 13, 13. These axles 8 and 9 are connected together by means of the cross-rods or cables 14, which are attached to the axles in any convenient way, and which cross each other at a distance apart, so that there may be arranged therewith any suitable operating device for jointly actuating said cables 14, the result of which will be to turn the axles 8 and 9 so as to steer the car in one direction or the other. I may substitute one or more diagonal rods or wires, or a pair of the same, for these cables, if desired.

Beneath the main frame 4 or above the same, being suitably supported in connection therewith, lies a shaft 15 transversely across the machine, which is provided at its opposite end with friction rollers, pulleys, or wheels 16, which are adapted to come easily into contact with the peripheries of the pair of wheels 12 and the other pair of wheels 13. The peripheries of these wheels 12 and 13 are usually shod with pneumatic tires or other resilient circumferential means, so that the frictional pressure between them and the wheels 16 will enable said wheels to effectively impart rotary motion to the wheels 12 and 13, and thus drive the car. When the car is being driven forward or back, therefore, the friction wheels 16 are in close contact with the peripheries of all four of the wheels 12 and 13, said peripheries being therefore slightly compressed, as indicated in Fig. 1, so as to insure a driving engagement, and in this case it is obvious that the drive will be what may be called a four-wheel drive, that is to say, a driving action which is taking place at four distinct points, and thus a great deal of power will be generated and applied, and a movement of the car in one direction or the other will be effective and capable of sustaining and transporting a heavy load. The motor or gas engine, as 17, by means of which shaft 15 is driven, is supported in any suitable way beneath the main frame 4 or upon or in connection therewith, and I have not found it necessary to illustrate more than the outline of the same in the drawing. Obviously the motor and its shaft and the driving pulleys 16 may partake of a great variety of different forms, and I do not wish to be restricted to any precise structure or arrangement thereof, but reserve the liberty of employing such specimens of parts as may do the work, providing only under ordinary conditions the driving mechanism is what should be properly termed a four-wheel drive mechanism.

Passing now to consider the method of steering my improved auto-car, it will be obvious that when the cross-cables 14 are actuated in such a way as to turn the shafts 8 and 9 jointly upon their pivots, the result will be to release one member of one pair of large wheels from the companion friction wheel 16, and also to release one member of the other pair of large wheels from its companion friction wheel 16, as indicated in dotted lines in Fig. 3, such release being brought about obviously by the loosening up of two of the wheels and drawing their tire edges away from their companion friction wheel on one side of the car, and correspondingly pressing the other two large wheels more tightly against their companion friction wheel on the other side of the car and causing them to bite with a firmer and stiffer engagement, the pneumatic or resilient tires of these latter two wheels being, therefore, compressed much harder then they normally are when the four-wheel drive is in effect; therefore, in making a turn the drive changes from a four-wheel drive to a two-wheel drive (on one side or the other), but said drive is positive and regular in its action, and it will be seen that the car can be turned about in a small space with perfect control and ease, with no danger of skidding or overturning or slipping to one side or the other, inasmuch as the drive is always a positive drive and the large wheels are never free to turn singly or independently, but are always under the control of the friction driving-wheels.

Many changes in the precise details of the invention may be made without departing therefrom and also numerous additional features not illustrated herein may be employed with useful effect in order to contribute to the most beneficial result in practice, and I therefore reserve the liberty of making such changes as may be found in practice to be desirable and necessary.

Having thus described my invention, what I claim as new and desire to secure by Letters Patent is:

The herein-described gasolene or internal combustion engine perambulator, consisting of a main frame, pivoted axles supported thereon, drive wheels on said axles, a pair of friction wheels for driving the four drive wheels as a four-wheel drive, front and rear seats supported on the main frame, lateral mudguards, foot rests at the ends of the main frame, and a receptacle between the seat backs for containing paraphernalia.

In testimony whereof I hereunto affix my signature.

GEORGE D. EIGHMIE.

Copies of this patent may be obtained for five cents each, by addressing the "Commissioner of Patents, Washington, D. C."